United States Patent
Abraham et al.

(10) Patent No.: US 12,261,936 B2
(45) Date of Patent: Mar. 25, 2025

(54) TECHNOLOGIES FOR REAL-TIME UPDATING OF ENCRYPTION KEYS

(71) Applicant: Intel Corporation, Santa Clara, CA (US)

(72) Inventors: Vinit Mathew Abraham, Hillsboro, OR (US); Raghunandan Makaram, Northborough, MA (US); Kirk S. Yap, Westborough, MA (US); Siva Prasad Gadey, Portland, OR (US); Tanmoy Kar, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/213,465

(22) Filed: Mar. 26, 2021

(65) Prior Publication Data
US 2021/0218548 A1  Jul. 15, 2021

(51) Int. Cl.
*G06F 21/62* (2013.01)
*G06F 16/23* (2019.01)
*H04L 9/06* (2006.01)
*H04L 9/08* (2006.01)

(52) U.S. Cl.
CPC .......... *H04L 9/0631* (2013.01); *H04L 9/0643* (2013.01); *H04L 9/0872* (2013.01)

(58) Field of Classification Search
CPC ... H04L 9/0631; H04L 9/0643; H04L 9/0872; H04L 9/0637; H04L 9/0891; H04L 9/16; H04L 9/3242; H04L 63/0428; H04L 63/061; H04L 63/068; H04L 9/0841
See application file for complete search history.

(56) References Cited

U.S. PATENT DOCUMENTS

| | | | |
|---|---|---|---|
| 6,957,329 B1 * | 10/2005 | Aleksic | H04N 21/2541 713/153 |
| 7,818,563 B1 * | 10/2010 | Dwork | H04L 63/06 713/151 |
| 11,265,301 B1 * | 3/2022 | Gupta | H04L 63/067 |
| 11,582,195 B1 * | 2/2023 | Karppanen | H04L 63/0457 |
| 2010/0151822 A1 * | 6/2010 | Medvinsky | H04W 12/08 455/410 |

(Continued)

OTHER PUBLICATIONS

Compute Express Link Consortium, Inc., "Compute Express Link (CSL) Specification, Revision 2.0," Oct. 2020 (628 pages).

*Primary Examiner* — Darren B Schwartz
(74) *Attorney, Agent, or Firm* — Alliance IP, LLC

(57) ABSTRACT

Techniques for real-time updating of encryption keys are disclosed. In the illustrative embodiment, an encrypted link is established between a local and remote processor over a point-to-point interconnect. The encrypted link is operated for some time until the encryption key should be updated. The local processor sends a key update message to the remote processor notifying the remote processor of the change. The remote processor prepares for the change and sends a key update confirmation message to the local processor. The local processor then sends a key switch message to the remote processor. The local processor pauses transmission of encrypted message while the remote processor completes use of the encrypted message. After a pause, the local processor continues sending encrypted messages with the updated encryption key.

25 Claims, 9 Drawing Sheets

(56) References Cited

U.S. PATENT DOCUMENTS

| | | | |
|---|---|---|---|
| 2011/0055558 A1* | 3/2011 | Liu | H04L 9/0637 |
| | | | 713/160 |
| 2015/0156181 A1* | 6/2015 | kerberg | H04L 63/068 |
| | | | 726/6 |
| 2016/0249210 A1* | 8/2016 | Chang | H04L 63/062 |
| 2017/0272408 A1* | 9/2017 | Li | H04L 63/08 |
| 2019/0220721 A1* | 7/2019 | Chhabra | G06K 19/0724 |
| 2019/0288842 A1* | 9/2019 | Weis | H04L 9/0891 |
| 2020/0245401 A1* | 7/2020 | Ingale | H04L 69/322 |
| 2021/0075587 A1* | 3/2021 | Alwen | H04L 9/0891 |

\* cited by examiner

TECHNOLOGIES FOR REAL-TIME UPDATING OF ENCRYPTION KEYS

BACKGROUND

Communication channels in compute systems are encrypted, such as communication channel between different components of a compute system. In some cases, encryption keys should be periodically updated. The encryption keys can be updated by shutting down a communication channel, updating the encryption keys, and then restarting the communication channel along with a warm reset of the components communicating over the communication channel.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
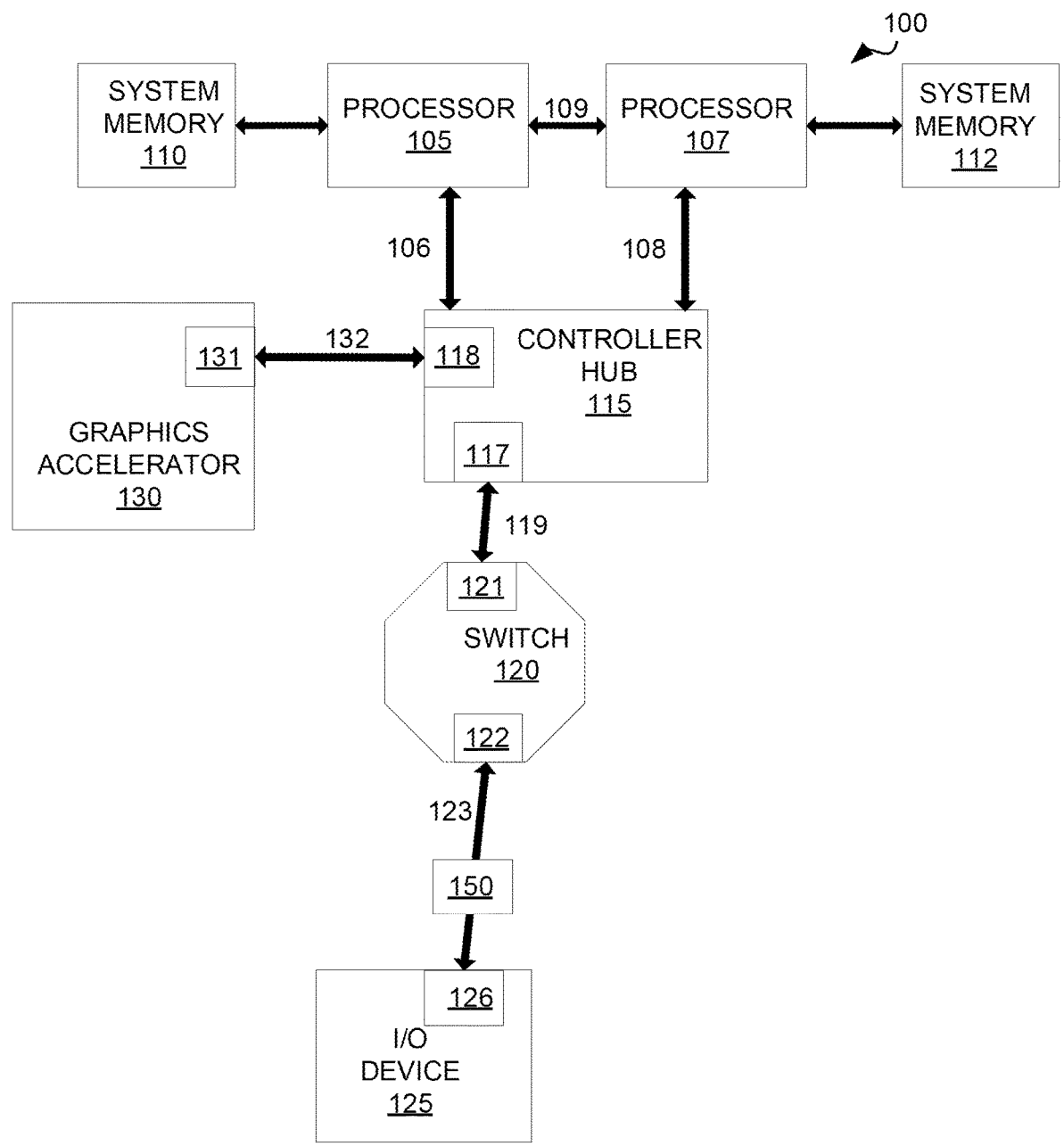
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring embodiments of the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the present disclosure.

Referring to FIG. 1, an embodiment of a fabric composed of point-to-point Links that interconnect a set of components is illustrated. System 100 includes processor 105, processor 107, system memory 110 coupled to processor 105, system memory 112 coupled to processor 107, and controller hub 115. Processor 105 includes any processing element, such as a microprocessor, a host processor, an embedded processor, a co-processor, or other processor. Processor 105 and processor 107 are connected by a link 109. In the illustrative embodiment, the link 109 is a low-latency point-to-point coherent interconnect, such as a Quick Path Interconnect (QPI) or an Ultra Path Interconnect (UPI). Processors 105 and 107 are coupled to controller hub 115 through front-side buses (FSB) 106 and 108, respectively. It should be appreciated that, in some embodiments, the system 100 may include more or fewer processors. In systems 100 with more processors, each pair of processors may be connected by a link 109. In one embodiment, FSB 106 is a serial point-to-point interconnect as described below. In another embodiment, link 106 includes a serial, differential interconnect architecture that is compliant with different interconnect standard, such as a Quick Path Interconnect (QPI) or an Ultra Path Interconnect (UPI). In some implementations, the system may include logic to implement multiple protocol stacks and further logic to negotiation alternate protocols to be run on top of a common physical layer, among other example features.

System memory 110 and 112 include any memory device, such as random access memory (RAM), non-volatile (NV) memory, or other memory accessible by devices in system 100. System memory 110 and 112 are coupled to processor 105 and 107, respectively, though a memory interface. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processors 105 and 107, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e., up a hierarchy towards a root complex, to controller hub 115 and downstream, i.e., down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
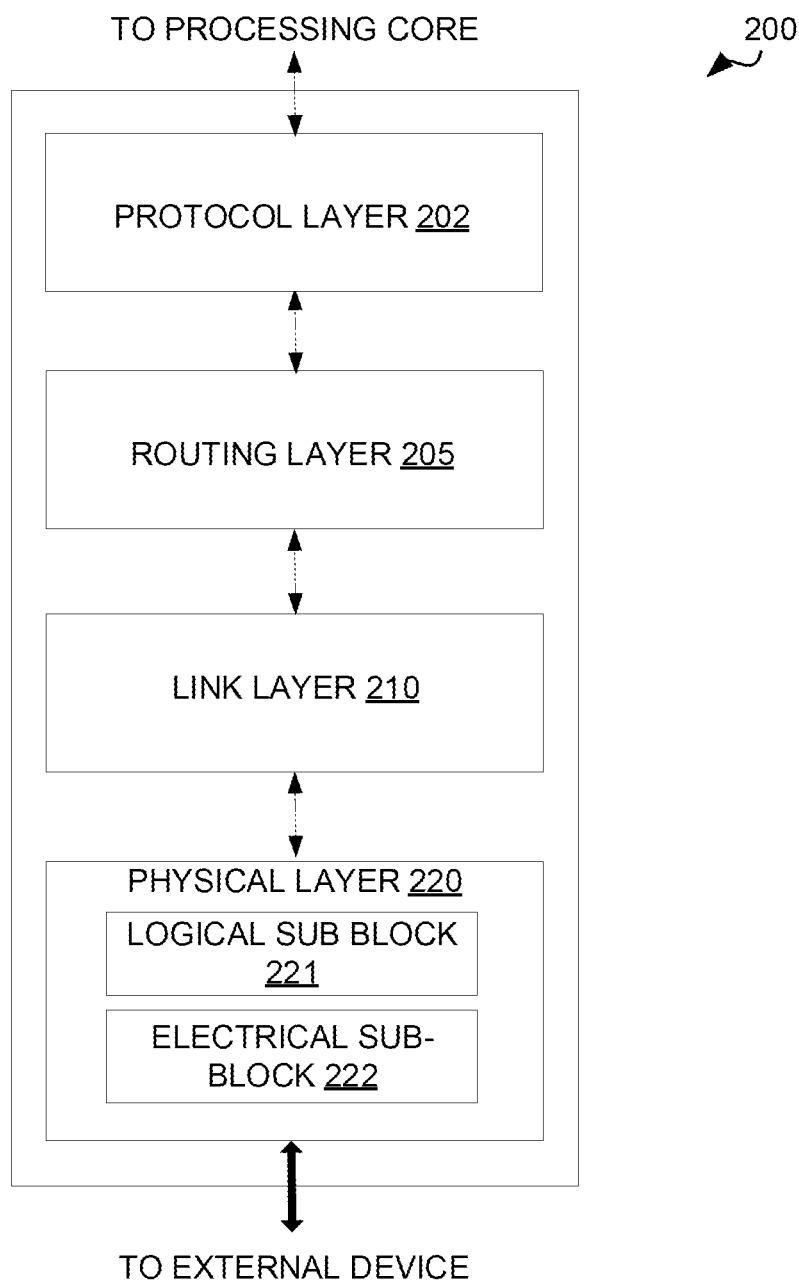
FIG. 2 illustrates an embodiment of a interconnect architecture including a layered stack.
Figure 3:
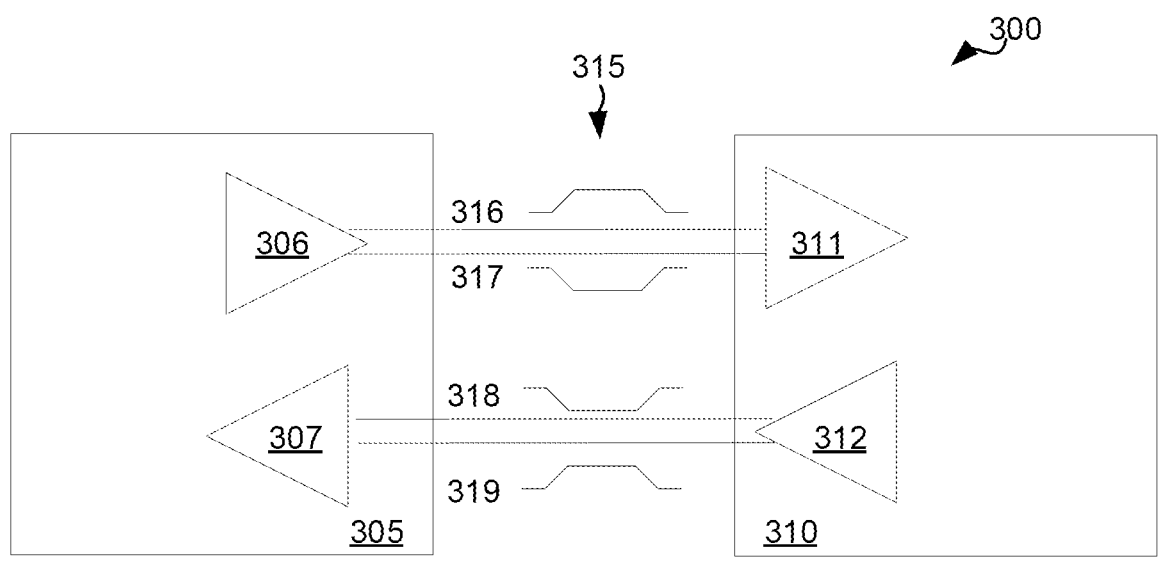
FIG. 3 illustrates an embodiment of a transmitter and receiver pair for an interconnect architecture.

Turning to FIG. 2 an embodiment of a layered protocol stack is illustrated. Layered protocol stack 200 includes any form of a layered communication stack, such as a Quick Path Interconnect (QPI) stack, an Ultra Path Interconnect (UPI) stack, a PCIe stack, a Compute Express Link (CXL), a next generation high performance computing interconnect stack, or other layered stack. Although the discussion immediately below in reference to FIGS. 1-3 are in relation to a UPI stack, the same concepts may be applied to other interconnect stacks. In one embodiment, protocol stack 200 is a UPI protocol stack including protocol layer 202, routing layer 205, link layer 210, and physical layer 220. An interface or link, such as link 109 in FIG. 1, may be represented as communication protocol stack 200. Representation as a communication protocol stack may also be referred to as a module or interface implementing/including a protocol stack.

UPI uses packets to communicate information between components. Packets are formed in the Protocol Layer 202 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally to the form that can be processed by the Protocol Layer 202 of the receiving device.

Protocol Layer

In one embodiment, protocol layer 202 is to provide an interface between a device's processing core and the interconnect architecture, such as data link layer 210 and physical layer 220. In this regard, a primary responsibility of the protocol layer 202 is the assembly and disassembly of packets. The packets may be categorized into different classes, such as home, snoop, data response, non-data response, non-coherent standard, and non-coherent bypass.

Routing Layer

The routing layer 205 may be used to determine the course that a packet will traverse across the available system interconnects. Routing tables may be defined by firmware and describe the possible paths that a packet can follow. In small configurations, such as a two-socket platform, the routing options are limited and the routing tables quite simple. For larger systems, the routing table options may be more complex, giving the flexibility of routing and rerouting traffic.

Link Layer

Link layer 210, also referred to as data link layer 210, acts as an intermediate stage between protocol layer 202 and the physical layer 220. In one embodiment, a responsibility of the data link layer 210 is providing a reliable mechanism for exchanging packets between two components. One side of the data link layer 210 accepts packets assembled by the protocol layer 202, applies an error detection code, i.e., CRC, and submits the modified packets to the physical layer 220 for transmission across a physical to an external device. In receiving packets, the data link layer 210 checks the CRC and, if an error is detected, instructs the transmitting device to resend. In the illustrative embodiment, CRC are performed at the flow control unit (flit) level rather than the packet level. In the illustrative embodiment, each flit is 80 bits. In other embodiments, each flit may be any suitable length, such as 16, 20, 32, 40, 64, 80, or 128 bits.

In the illustrative embodiment, the link layer 210 manages credit-base flow control. In this scheme, a device, such as processor 105 in FIG. 1, advertises an initial amount of credit for each of the receive buffers in link layer 210. An external device at the opposite end of the link, such as processor 107 in FIG. 1, counts the number of credits consumed by each packet or flit. A transaction may be transmitted if the transaction does not exceed a credit limit. Upon receiving a response an amount of credit is restored. An advantage of a credit scheme is that the latency of credit return does not affect performance, provided that the credit limit is not encountered.

In some embodiments, the link layer 210 may perform encryption and decryption on phits, flits, or packets. The encryption functions are described in more detail below. In other embodiments, the encryption and decryption may be done at the physical layer 220 or the protocol layer 202.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In the illustrative embodiment, the physical layer 220 sends and receives bits in groups of 20 bits, called a physical unit or phit. In some embodiments, a line coding, such as an 8b/10b transmission code or a 64b/66b transmission code, is employed. In some embodiments, special symbols are used to frame a packet with frames 223. In addition, in one example, the receiver also provides a symbol clock recovered from the incoming serial stream.

As stated above, although protocol layer 202, routing layer 205, link layer 210, and physical layer 220 are discussed in reference to a specific embodiment of a QPI protocol stack, a layered protocol stack is not so limited. In fact, any layered protocol may be included/implemented. As an example, a port/interface that is represented as a layered protocol includes: (1) a first layer to assemble packets, i.e. a protocol layer; a second layer to sequence packets, i.e. a link layer; and a third layer to transmit the packets, i.e. a physical layer. As a specific example, a common standard interface (CSI) layered protocol is utilized.

Referring next to FIG. 3, an embodiment of a UPI serial point-to-point link is illustrated. Although an embodiment of a UPI serial point-to-point link is illustrated, a serial point-to-point link is not so limited, as it includes any transmission path for transmitting serial data. In the embodiment shown, a basic UPI serial point-to-point link includes two, low-voltage, differentially driven signal pairs: a transmit pair 306/312 and a receive pair 311/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in a UPI link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 5, 8, 10, 12, 16, 20, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., UPI), while others (e.g., Displayport) may not and may even including only transmit or only receive pairs, among other examples. A link may refer to a one-way link (such as the link established by transmission logic 306 and receive logic 311) or may refer to a bi-directional link (such as the links established by transmission logic 306 and 312 and receive logic 307 and 311).

A differential pair refers to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 4:
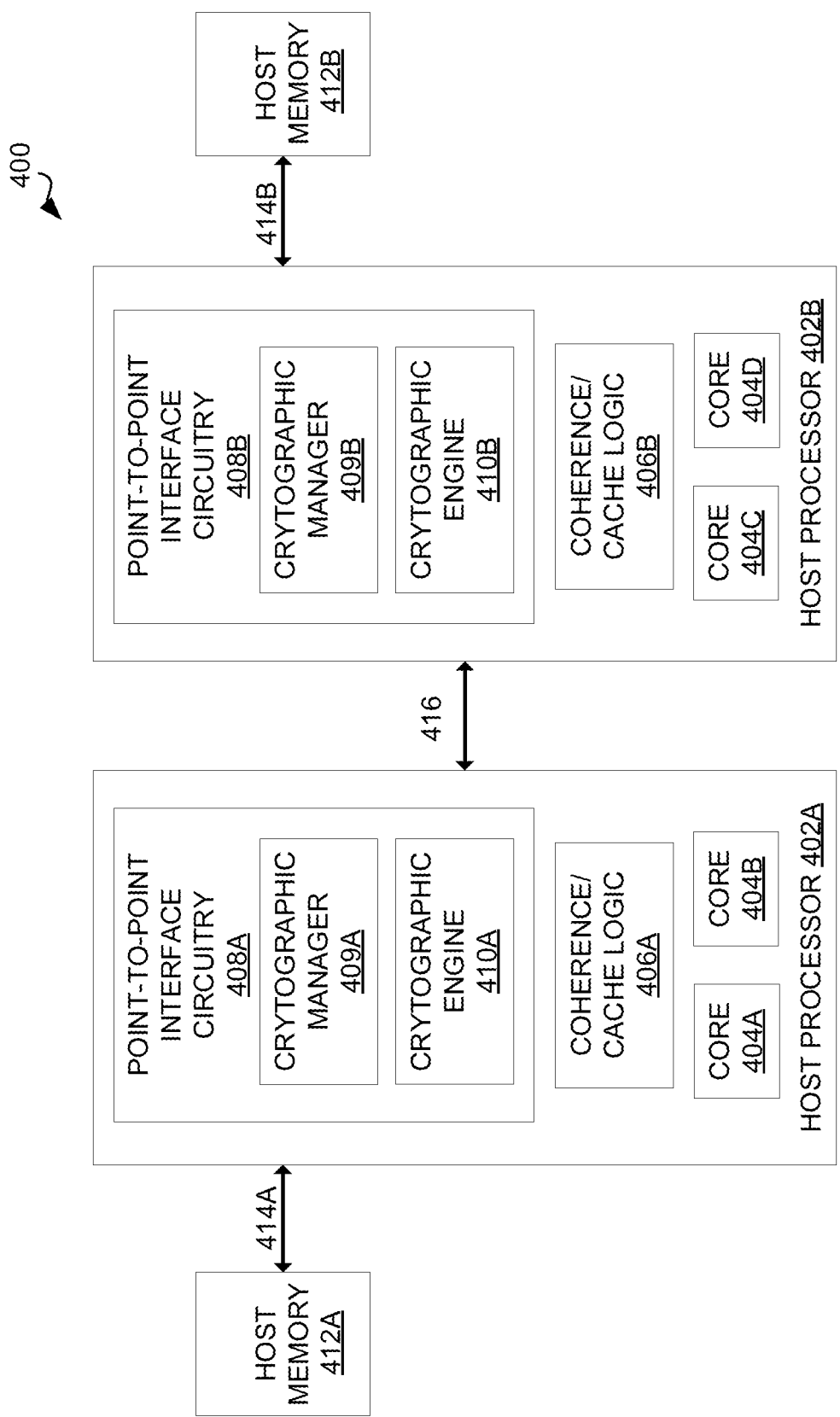
FIG. 4 illustrates an example implementation of a computing system including two host processors coupled by a link.

Turning to FIG. 4, a simplified block diagram 400 is shown illustrating an example system utilizing a UPI link 416. For instance, the link 416 may interconnect a first host processor 402A (e.g., a first CPU) and a second host processor 402B (e.g., a second CPU). In this example, each host processor 402A, 402B includes one or more processor cores (e.g., 404A-D). Each processor 402A, 402B is connected to host memory 412A, 412B over a link 414A, 414B. In this example, each host processor 402A, 402B may include circuitry to implement coherence/cache logic 406A, 406B. Each processor 402A, 402B includes point-to-point interface circuitry 408A, 408B to communicate over the UPI link 416. Point-to-point interface circuitry 408B may be similar to point-to-point interface circuitry 408A, described in more detail below.

The point-to-point interface circuitry 408A is configured to send and receive data over the UPI link 416. The point-to-point interface circuitry 408A may, e.g., implement the UPI stack 200 described above in regard to FIG. 2. The point-to-point interface circuitry 408A includes a cryptographic manager 409A and a cryptographic engine 410A. It should be appreciated that, in some embodiments, the point-to-point interface circuitry 408A operates both a transmit link and a receive link. As such, the point-to-point interface circuitry 408A may include an independent cryptographic manager 409A and/or an independent cryptographic engine 410A for each of a transmit link and a receive link. In other embodiments, a single cryptographic manager 409A and/or a single cryptographic engine 410A may be able to operate both a transmit channel and a receive channel contemporaneously.

The point-to-point interface circuitry 408A may be embodied as hardware, software, firmware, or a combination thereof. For example, the various modules, logic, and other components of the point-to-point circuitry 408A may form a portion of, or otherwise be established by, the processor 402A or other hardware components such as the host memory 412A, data storage, etc. For example, in one embodiment, the cryptographic manager 409A to control update of the keys used by the cryptographic engine 410A may be embodied as firmware or software. In some embodiments, the cryptographic manager 409A may be embodied as a processor as well as memory and/or data storage storing instructions to be executed by the processor. It should be appreciated that the cryptographic manager 409A does not need to be fully contained within the host processor 402A. For example, the cryptographic manager 409A controlling key updates for the cryptographic engine 410A and cryptographic engine 410B may be partially or wholly within the host processor 402B or a processor of a different device. The cryptographic manager 409A may perform any suitable task relating the update of keys, such as determining whether a key should be updated, generating and distributing keys, instructing the point-to-point interface circuitry 408A to send messages related to the key update process (such as a key update message, a key update confirmation message, or a key switch message), etc. In some embodiments, the cryptographic manager 409A may include the cryptographic engine 410A. It should be appreciated that some of the functionality of the point-to-point interface circuitry 408A may require a hardware implementation, in which case embodiments which implement such functionality will be embodied at least partially as hardware.

The cryptographic manager 409A is configured to perform various tasks related to encryption, creating and distributing encryption keys, updating encryption keys, configuring the cryptographic engine 410A with encryption keys, etc. The cryptographic engine 410A is configured to encrypt and decrypt messages sent to and received from a link with another device. The cryptographic manager 409A may establish an encrypted link between the local processor 402A and a remote processor, such as processor 402B using the cryptographic engine 410A. Additionally or alternatively, in some embodiments, the cryptographic manager 409A may establish a link with other components, such as a field programmable gate array, a root complex, a chipset, a memory, etc.

To establish the encrypted link, the cryptographic manager 409A generates an initial encryption key using a public key cryptography system, such as a Diffie-Hellman key exchange. The cryptographic manager 409A may use the public key cryptography system to generate a key for any suitable encryption algorithm. In the illustrative embodiment, the cryptographic manager 409A uses the encryption key to establish an Advanced Encryption Standard (AES) link in Galois/Counter Mode (AES-GCM). In other embodiments, the cryptographic manager 409A may establish the encrypted link using any suitable encryption algorithm, such as AES with Galois message authentication code (GMAC). The cryptographic manager 409A may establish a random or pseudo-random initialization vector to use to begin the encryption.

In the illustrative embodiment, the cryptographic manager 409A establishes an independent encryption link for a transmit link and a receive link, such as the transmit link and receive link shown in FIG. 3. The cryptographic manager 409A may establish a transmit link based on a transmit encryption key and a receive link based on a receive encryption key. In the illustrative embodiment, the cryptographic manager 409A controls the transmit link, and the remote processor (such as processor 402B) controls the receive link (i.e., the link in which the remote processor is on the transmit end and the processor 402A is the receive end). In some embodiments, the encryption link between the local processor and the remote processor may include several channels, each of which may have a separate encryption key. For example, a link may have two channels, each of which has a transmit encryption key and a receive encryption key. In some embodiments, the channels are virtual channels, each of which is communicated over the same physical link. It should be appreciated that, in some embodiments, each of the messages sent between the local and remote processors may include an indication of the channel the message corresponds to.

Once established, the cryptographic manager 409A may operate the encrypted link between the local processor 402A and the remote processor using the cryptographic engine 410A. The cryptographic engine 410A may send and receive packets, flits, and phits. In the illustrative embodiment, each packet is encrypted and decrypted. In some embodiments, some subset of the packet, such as the payload, may be encrypted, while other parts of the packet, such as a header or CRC information, may not be encrypted. In other embodiments, encryption and decryption may be applied to each flit or phit. In the illustrative embodiment, the cryptographic engine 410A is pipelined, such that several packets can undergo different stages of encryption or decryption simultaneously. It should be appreciated that, in some embodiments, some packets, flits, or phits may not be encrypted, such as control packets. The cryptographic engine 410A may, in conjunction with other components such as the coherence/cache logic 406A, process memory requests, such as requests for memory sent to the remote processor, requests for memory sent by the remote processor, data response messages sent to the remote processor, data response messages received from the remote processor, etc. The cryptographic engine 410A may also encrypt and decrypt other types of packets, such as control packets, packets related to the encryption of the link, etc.

In certain circumstances, the transmit encryption key should be updated. For example, the cryptographic manager 409A may determine whether the transmit encryption key should be updated based on an amount of data that has been transferred using the transmit encryption key or may determine whether the transmit encryption key should be updated based on an amount of time since the key was first used. The amount of time could be any suitable amount of time, such as any time from one hour up to one year. In the illustrative embodiment, the threshold amount of time is several months. In other embodiments, the cryptographic manager 409A may determine whether the transmit encryption key should be updated based on any suitable combination of an amount of data that has been transferred using the transmit encryption key, an amount of time since the key was first used, etc. The cryptographic manager 409A may make the determination based on encryption standards, such as encryption standards from the National Institute for Standards and Technology (NIST). In some embodiments, the cryptographic manager 409A may be instructed to update the encryption key, such as by a user or an orchestrator server. The cryptographic manager 409A may be instructed to update the encryption key if, e.g., a data breach occurred that could affect the current key.

When a transmit key is to be updated, the cryptographic manager 409A generates an updated encryption key. The cryptographic manager 409A may generate the updated encryption key in any suitable manner. For example, the cryptographic manager 409A may use a random number generator to generate a new key, or the cryptographic manager 409A may use a key generation function or key derivation function (KDF) on the previously generated random key to generate a new key. Once a new key has been generated, cryptographic manager 409A may send the key to the remote agent using any suitable manner. For example, the cryptographic manager 409A may use a similar Diffie-Hellman key exchange protocol used to generate the initial transmit encryption key or the cryptographic manager 409A may use a previously-generated session key to send a key to the remote processor. The cryptographic manager 409A stores the updated transmit encryption key in a shadow register of the cryptographic engine 409A. By placing the transmit encryption key in the shadow register, the cryptographic engine 410A can be prepared to begin using the updated encryption key with little or no advanced notice.

After preparing the updated transmit encryption key, the cryptographic manager 409A sends a key update message to the remote processor. In some embodiment, the cryptographic manager 409A sends the updated transmit encryption key in the key update message. In other embodiments, the cryptographic manager 409A may coordinate with the remote processor to share the updated transmit encryption key before or after sending the key update message.

After the cryptographic manager 409A sends the key update message, the remote processor prepares to switch to using the updated transmit encryption key. While it is doing so, the cryptographic engine 410A continues operating the encryption link between the local processor and the remote processor using the current transmit encryption key (and the current receive encryption key). After the remote processor is ready to switch to the updated transmit encryption key, it sends a key update confirmation message to the cryptographic manager 409A. In the illustrative embodiment, the key update confirmation message indicates that the remote processor is ready to switch to the updated key. In other embodiments, the key update confirmation message may indicate that the remote processor will be ready to switch to the updated key at a particular time in the future.

After receiving the key update confirmation message, the cryptographic manager 409A sends a key switch message to the remote processor. In the illustrative embodiment, the key switch message instructs the remote processor to begin using the updated transmit encryption key and indicates that the next message will be encrypted with the updated transmit encryption key. In some embodiments, the key switch message indicates that the use of the updated transmit encryption key will begin at some point in the future, such as at a particular time or after a particular number of additional messages have been sent with the updated transmit encryption key.

After sending the key switch message, the cryptographic engine 410A activates the updated transmit encryption key. In the illustrative embodiment, the cryptographic engine 410A activates the updated transmit encryption key immediately after sending the key switch message. To do so, in the illustrative embodiment, the cryptographic engine 410A copies the updated transmit encryption key from a shadow register to an active register. In some embodiments, the cryptographic engine 410A may wait to activate the updated transmit encryption key until a later time, such as when the first message is to be encrypted using the updated transmit encryption key.

After sending the key switch message, the cryptographic engine 410A pauses transmission of encrypted messages in order to allow the remote processor time to activate the updated transmit key. In the illustrative embodiment, the cryptographic engine 410A pauses transmission of all encrypted messages (e.g., pauses transmission of encrypted messages on the only channel in use). In other embodiments, the cryptographic engine 410A may only pause sending encrypted messages on the channel corresponding to the updated transmit encryption key and may continue sending encrypted messages for other channels that use other encryption keys. It should be appreciated that, in embodiments which do not encrypt all messages, the point-to-point interface circuitry 408A may continue to send unencrypted messages on the same channel. In some embodiments, during the pause, the cryptographic engine 410A may begin to fill a pipeline of encrypted messages to be sent using the updated transmit encryption key.

The cryptographic engine 410A may pause for any suitable amount of time, such as any amount of time from 1-1,000 nanoseconds. In the illustrative embodiment, the cryptographic engine 410A pauses for a pre-determined amount of time of 100 nanoseconds. In some embodiments, the cryptographic engine 410A may pause until a trigger occurs, such as another confirmation message from the remote processor. After completing the pause, the cryptographic engine 410A can continue operating the encrypted link. It should be appreciated that, in the illustrative embodiment, the cryptographic engine 410A pauses sending encrypted messages on the channel associated with the key being updated. The cryptographic engine 410A may send unencrypted messages, send encrypted messages for other channels, receive encrypted messages, etc.

In the illustrative embodiment, the cryptographic manager 409A manages the transmit encryption key used to encrypt data sent to the processor 402B. Conversely, the cryptographic manager 409B manages the key used to encrypt data sent from the processor 402B to the cryptographic engine 410A using what is, from the perspective of the cryptographic engine 410A, the receive encrypt key.

When the cryptographic manager 409B determines that the receive encryption key should be updated, it sends a key update message to the cryptographic engine 410A indicating that the receive encryption key should be updated. The receive encryption key can be shared with the cryptographic engine 410A in a similar manner as the transmit encryption key is shared with the cryptographic engine 410B.

The cryptographic engine 410A stores the updated receive encryption key in a shadow register, such as a shadow register of the cryptographic engine 410A. The illustrative cryptographic engine 410A stores the updated receive encryption key in a shadow register in order to be able to switch to using the updated receive encryption key quickly. The cryptographic engine 410A may take any additional or alternative action necessary to prepare to switch to using the updated receive encryption key on short notice. When the cryptographic engine 410A is ready to switch to the updated receive encryption key, the cryptographic engine 410A sends a key update confirmation message to the remote processor. The illustrative embodiment, the key update confirmation message indicates that the cryptographic engine 410A is ready to switch to the updated key. In other embodiments, the key update confirmation message may indicate that the cryptographic engine 410A will be ready to switch to the updated key at a particular time in the future.

When the cryptographic manager 409B is ready to switch to the receive encryption key, it sends a key switch message to the cryptographic engine 410A. In the illustrative embodiment, the key switch message instructs the cryptographic engine 410A to begin using the updated transmit encryption key and indicates that the next message will be encrypted with the updated transmit encryption key. In some embodiments, the key switch message indicates that the use of the updated transmit encryption key will begin at some point in the future, such as at a particular time or after a particular number of additional messages have been sent with the updated transmit encryption key.

After receiving the key switch message, the cryptographic engine 410A completes processing received messages with the current receive encryption key. In the illustrative embodiment, the cryptographic engine 410A operates a pipeline, and the cryptographic engine 410A must complete some or all of the decryption operation before changing the receive encryption key. Additionally or alternatively, the cryptographic engine 410A may perform tasks such as integrity verification with the current receive encryption key. It should be appreciated that, during the time that the cryptographic engine 410A is clearing out the pipeline based on the current receive encryption key, the cryptographic engine 410A cannot begin decrypting messages using the updated receive encryption key. As such, the remote processor will pause sending messages on the channel corresponding to the updated receive encryption key.

Once the processing operations using the current receive encryption key have been completed, the cryptographic engine 410A activates the updated receive encryption ley. The cryptographic engine 410A can then continue performing encryption operations.

It should be appreciated that the description of the cryptographic manager 409A and the cryptographic engine 410A above is for one possible embodiment, but other embodiments with additional or different operations or operations performed in a different order are possible. For example, the cryptographic manager 409A can determine the updated transmit encryption key before even determining that the transmit encryption key should be updated, such as shortly after activating a new transmit encryption key. As another example, the cryptographic manager 409A can send the transmit encryption key to the remote processor before or after sending the key update message. In yet another example, the cryptographic manager 409A may continue sending messages encrypted with the current transmit key after sending the key switch message, such as sending a predetermined number of messages before activating the updated encryption key and pausing transmission of encrypted messages.

Figure 5:
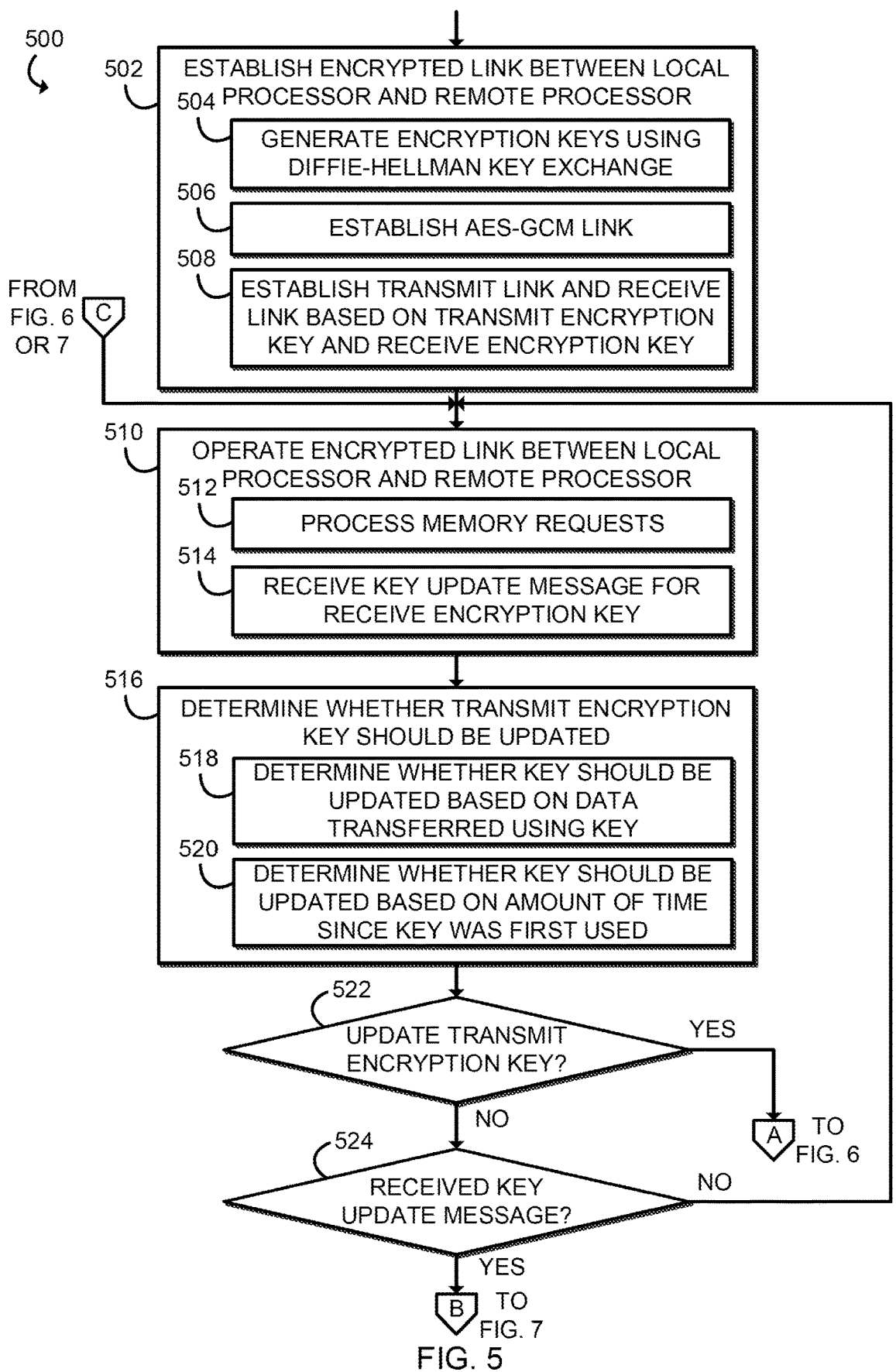
FIGS. 5-7 are a simplified flow diagram of at least one embodiment of a method for real-time updating of encryption keys that may be performed by the computing system of FIG. 1.

Referring now to FIG. 5, in use, the system 100 may execute a method 500 for real-time updating of encryption keys. The method 500 may be performed by any suitable combination of hardware, software, and/or other components of the system 100, such as the processor 402A, the point-to-point interface circuitry 408A, the cryptographic manager 409A, the cryptographic engine 410A, etc. In the embodiment discussed below, some of the method 500 is described as being performed by the processor 402A. It should be appreciate that, in other embodiments, some or all of the method 500 may be performed by any suitable component, such as hardware, firmware, and/or software of any suitable component, such as the processor 402A, the processor 402B, the host memory 412A, the host memory 412B, the cryptographic manager 409A, the cryptographic engine 410A, etc.

In block 502, the processor 402A establishes an encrypted link between the local processor 402A and a remote processor, such as processor 402B. It should be appreciated that the remote processor does not need to be any particular distance away from the processor 402A. Rather, the remote processor refers to the component on the other end of the encrypted link established between the processors. In practice, the remote processor may be, e.g., adjacent to the local processor on the same motherboard. It should also be appreciated that the link may be established between any two suitable components, such any combination of a processor, field programmable gate array, root complex, chipset, memory, etc.

In the illustrative embodiment, the processor 402A generates an initial encryption key using a public key cryptography system, such as a Diffie-Hellman key exchange in block 504. The processor 402A may use the public key cryptography system to generate a key for any suitable encryption algorithm. In the illustrative embodiment, the processor 402A uses the encryption key to encrypt and integrity protect the link using an Advanced Encryption Standard (AES) link Galois/Counter Mode (AES-GCM) in block 506. In other embodiments, the processor 402A may establish the encrypted link using any suitable encryption algorithm, such as AES Counter mode for encryption and AES Galois message authentication code (GMAC) for data integrity. The processor 402A may establish a random or pseudo-random initialization vector to use to begin the encryption.

In the illustrative embodiment, the processor 402A establishes an independent encryption link for a transmit link and a receive link. The processor 402A may establish a transmit link based on a transmit encryption key and a receive link based on a receive encryption key in block 508. In the illustrative embodiment, the processor 402A controls the transmit link, and the remote processor controls the receive link (i.e., the link in which the remote processor is on the transmit end and the processor 402A is the receive end). In some embodiments, the encryption link between the local processor and the remote processor may include several channels, each of which may have a separate encryption key. For example, a link may have two channels, each of which has a transmit encryption key and a receive encryption key. In some embodiments, the channels are virtual channels, each of which is communicated over the same physical link. It should be appreciated that, in some embodiments, each of the messages sent between the local and remote processors may include an indication of the channel the message corresponds to.

In block 510, the processor 402A operates the encrypted link between the local processor 402A and the remote processor. The processor 402A may send and receive packets, flits, and phits. In the illustrative embodiment, each packet is encrypted and decrypted. In some embodiments, some subset of the packet, such as the payload, may be encrypted, while other parts of the packet, such as a header or CRC information, may not be encrypted. In other embodiments, encryption and decryption may be applied to each flit or phit. Each transmitted (or received) packet may be encrypted (or decrypted) in a cryptographic engine, such as cryptographic engine 410A. In the illustrative embodiment, the cryptographic engine 410A is pipelined, such that several packets can undergo different stages of encryption or decryption simultaneously. It should be appreciated that, in some embodiments, some packets, flits, or phits may not be encrypted, such as control packets.

In block 512, the processor 402A processes memory requests, such as requests for memory sent to the remote processor, requests for memory sent by the remote processor, data response messages sent to the remote processor, data response messages received from the remote processor, etc. The processor 402A may also process other types of packets, such as control packets, packets related to the encryption of the link, etc.

In block 514, the processor 402A may receive from the remote processor a key update message for the receive encryption key indicating that the receive encryption key should be updated. In the illustrative embodiment, the key update message includes an updated receive encryption key. In embodiments with different encryption keys for different channels, the key update message includes an indication of the channel for which the key is to be updated.

In block 518, the processor 402A determines whether the transmit encryption key should be updated. The processor 402A may determine whether the transmit encryption key should be updated based on an amount of data that has been transferred using the transmit encryption key in block 518. The processor 402A may determine whether the transmit encryption key should be updated based on an amount of time since the key was first used in block 520. The amount of time could be any suitable amount of time, such as any time from one hour up to one year. In the illustrative embodiment, the threshold amount of time is several months. In other embodiments, the processor 402A may determine whether the transmit encryption key should be updated based on any suitable combination of an amount of data that has been transferred using the transmit encryption key, an amount of time since the key was first used, etc. The processor 402A may make the determination based on encryption standards, such as encryption standards from the National Institute for Standards and Technology (NIST). In some embodiments, the processor 402A may be instructed to update the encryption key, such as by a user or an orchestrator server. The processor 402A may be instructed to update the encryption key if, e.g., a data breach occurred that could affect the current key.

Referring now to block 522, if the processor 402A determined that the transmit encryption key should not be updated, the method 500 proceeds to block 524 to check if a key update message was received from the remote processor in regard to the receive encryption key. If the processor 402A determined that the transmit encryption key should be updated, the method 500 proceeds to block 526 in FIG. 6.

Figure 6:
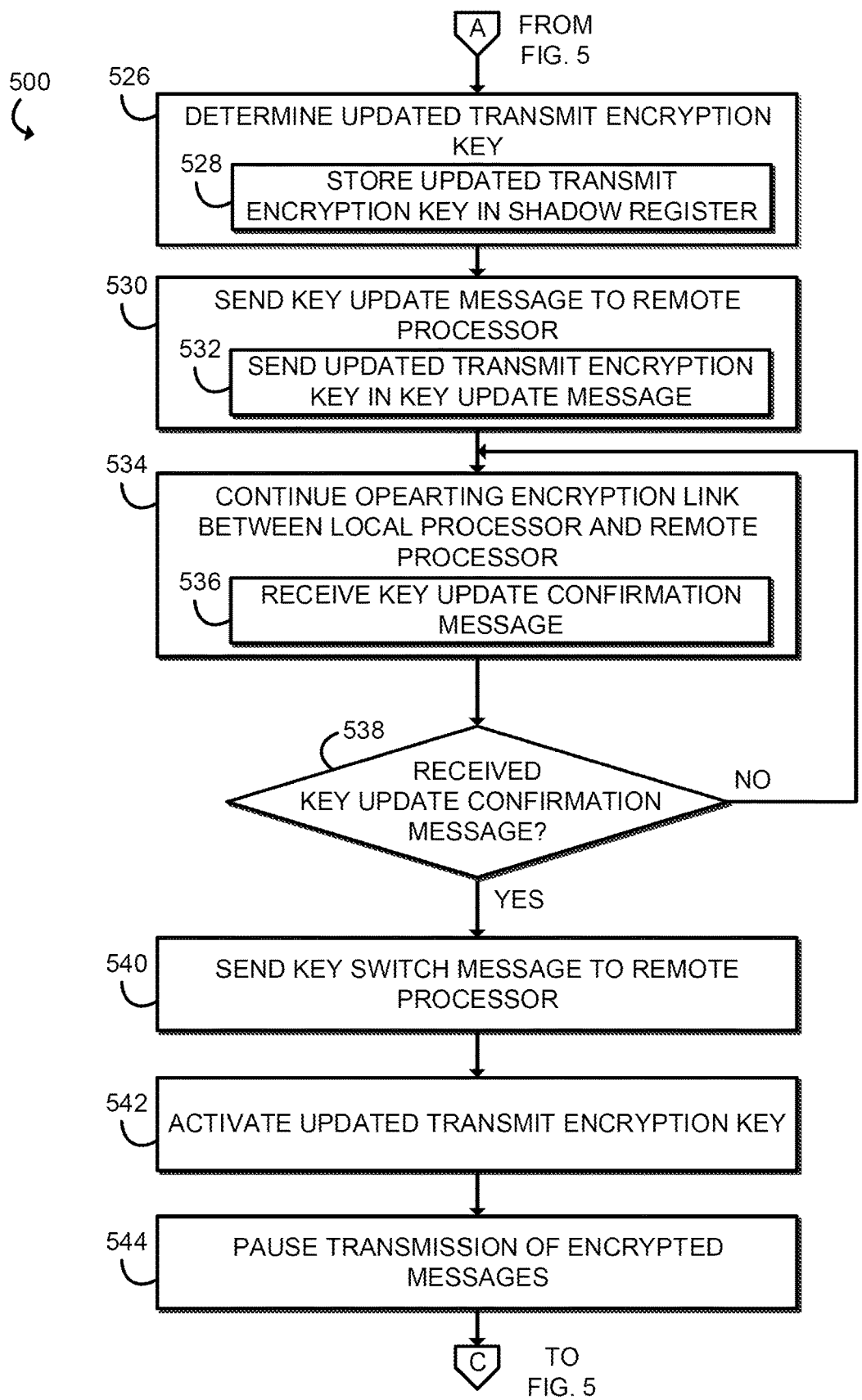

Referring now to FIG. 6, in block 526, the processor 402A determines the updated transmit encryption key. The processor 402A may determine the updated transmit encryption key in any suitable manner. For example, the processor 402A may use a similar Diffie-Hellman key exchange protocol used to generate the initial transmit encryption key or the processor 402A may use a previously-generated session key to send a key to the remote processor. In some embodiments, the generation of the updated may be performed by specialized key generation hardware. The processor 402A may generate the updated encryption key using, e.g., a random or pseudo-random number generator. In block 528, the processor 402A stores the updated transmit encryption key in a shadow register, such as in a shadow register of the cryptographic engine 410A. By placing the transmit encryption key in the shadow register, the cryptographic engine 410A can be prepared to begin using the updated encryption key with little or no advanced notice.

In block 530, the processor 402A sends a key update message to the remote processor. In some embodiments, the processor 402A sends the updated transmit encryption key in the key update message in block 532. In other embodiments, the processor 402A may coordinate with the remote processor to the updated transmit encryption key before or after sending the key update message. In the illustrative embodiment, the key update message is embodied as a flit. Additionally or alternatively, the key update message may be embodied as another type of message, such as a packet or phit.

After the processor 402A sends the key update message, the remote processor prepares to switch to using the updated transmit encryption key. While it is doing so, the processor 402A continues operating the encryption link between the local processor and the remote processor using the current transmit encryption key (and the current receive encryption key) in block 534. In block 536, the processor 402A receives a key update confirmation message from the remote processor. In the illustrative embodiment, the key update confirmation message indicates that the remote processor is ready to switch to the updated key. In other embodiments, the key update confirmation message may indicate that the remote processor will be ready to switch to the updated key at a particular time in the future. In the illustrative embodiment, the key update confirmation message is embodied as a flit. Additionally or alternatively, the key update confirmation message may be embodied as another type of message, such as a packet or phit.

In block 538, if the processor 402A did not receive a key update confirmation message, the method 500 loops back to block 534 to continue operating the encrypted link. If the processor 402A did receive a key update confirmation message, the method 500 proceeds to block 540.

In block 540, the processor 402A sends a key switch message to the remote processor. In the illustrative embodiment, the key switch message instructs the remote processor to begin using the updated transmit encryption key and indicates that the next message will be encrypted with the updated transmit encryption key. In some embodiments, the key switch message indicates that the use of the updated transmit encryption key will begin at some point in the future, such as at a particular time or after a particular number of additional messages have been sent with the updated transmit encryption key. In the illustrative embodiment, the key switch message is embodied as a flit. Additionally or alternatively, the key switch message may be embodied as another type of message, such as a packet or phit.

In block 542, the processor 402A activates the updated transmit encryption key. In the illustrative embodiment the processor 402A activates the updated transmit encryption key immediately after sending the key switch message. To do so, in the illustrative embodiment, the cryptographic engine 410A copies the updated transmit encryption key from a shadow register to an active register. In some embodiments, the processor 402A may wait to activate the updated transmit encryption key until a later time, such as when the first message is to be encrypted using the updated transmit encryption key.

In block 544, the processor 402A pauses transmission of encrypted messages in order to allow the remote processor time to activate the updated transmit key. In the illustrative embodiment, the processor 402A pauses transmission of all encrypted messages (e.g., pauses transmission of encrypted messages on the only channel in use). In other embodiments, the processor 402A may only pause sending encrypted messages on the channel corresponding to the updated transmit encryption key and may continue sending encrypted messages for other channels that use other encryption keys. It should be appreciated that, in embodiments which do not encrypt all messages, the processor 402A may continue to send unencrypted messages on the same channel. In some embodiments, during the pause, the processor 402A may begin to fill a pipeline of encrypted messages to be sent using the updated transmit encryption key.

The processor 402A may pause for any suitable amount of time, such as any amount of time from 1-1,000 nanoseconds. In the illustrative embodiment, the processor 402A pauses for a pre-determined amount of time of 100 nanoseconds. In some embodiments, the processor 402A may pause until a trigger occurs, such as another confirmation message from the remote processor. After completing the pause, the processor 402A loops back to block 510 in FIG. 5 to continue operating the encrypted link.

Referring back to block 524 in FIG. 5, if the processor 402A did not receive a key update message from the remote processor in regard to the receive encryption key in block 514, the method 500 loops back to block 510 to continue operating the encrypted link. If the processor 402A did receive a key update message from the remote processor in regard to the receive encryption key in block 514, the method 500 proceeds to block 540 in FIG. 7.

Figure 7:
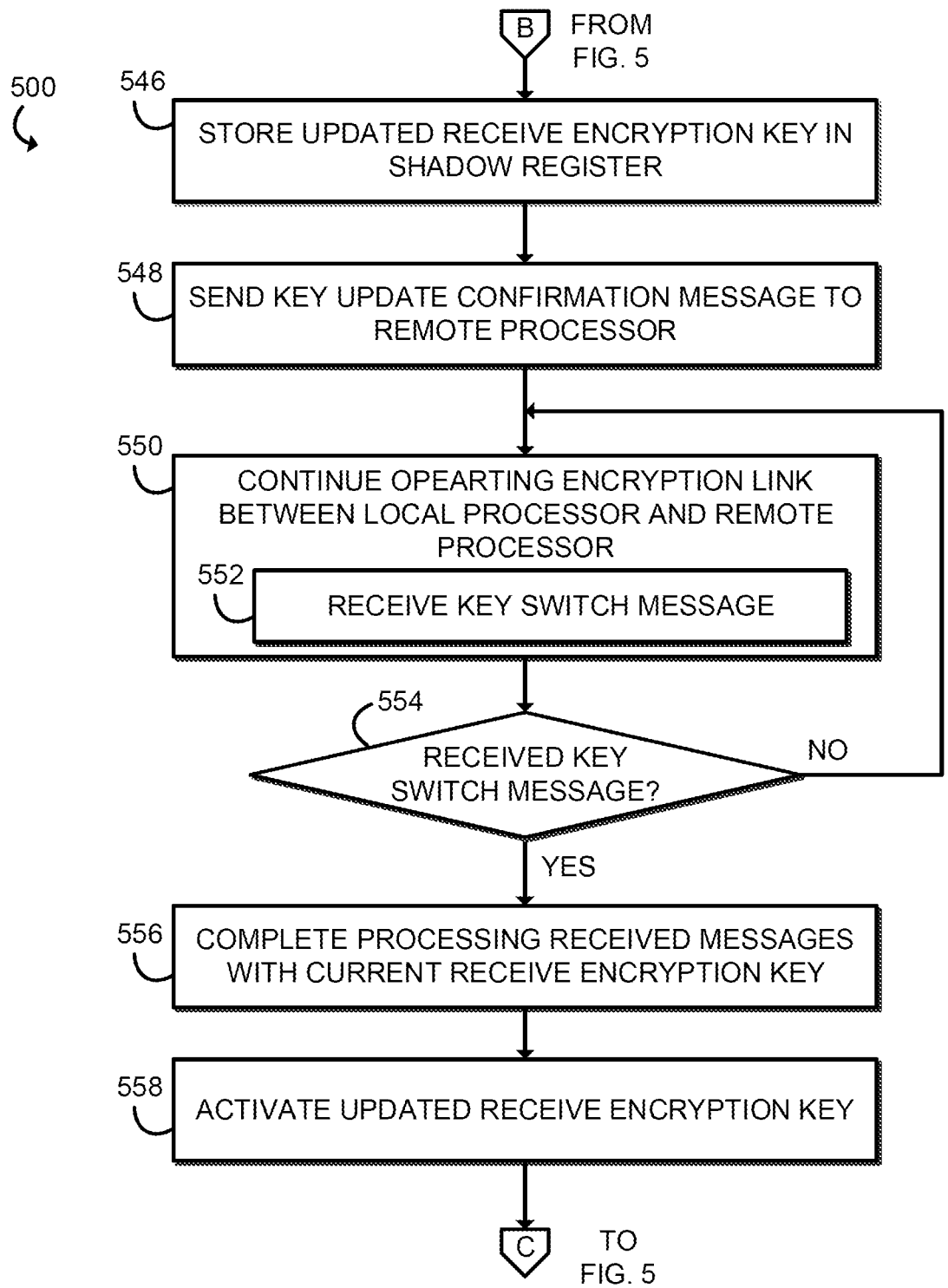

Referring now to FIG. 7, in block 546, the processor 402A stores the updated receive encryption key in a shadow register, such as a shadow register of the cryptographic engine 410A. The illustrative processor 402A stores the updated receive encryption key in a shadow register of the cryptographic engine 410A in order to be able to switch to using the updated receive encryption key quickly. The processor 402A may take any additional or alternative action necessary to prepare to switch to using the updated receive encryption key on short notice.

In block 548, the processor 402 sends a key update confirmation message to the remote processor. The illustrative embodiment, the key update confirmation message indicates that the processor 402A is ready to switch to the updated key. In other embodiments, the key update confirmation message may indicate that the processor 402A will be ready to switch to the updated key at a particular time in the future.

In block 550, the processor 402A continues operating the encryption link between the local processor and the remote processor using the current receive encryption key (and the current transmit encryption key). In block 552, the processor 402A receives a key switch message from the remote processor. In the illustrative embodiment, the key switch message instructs the processor 402A to begin using the updated transmit encryption key and indicates that the next message will be encrypted with the updated transmit encryption key. In some embodiments, the key switch message indicates that the use of the updated transmit encryption key will begin at some point in the future, such as at a particular time or after a particular number of additional messages have been sent with the updated transmit encryption key.

In block 554, if the processor 402A did not receive a key switch message, the method 500 loops back to block 550 to continue operating the encrypted link. If the processor 402A did receive a key update confirmation message, the method 500 proceeds to block 556.

In block 556, the processor 402A completes processing received messages with the current receive encryption key. In the illustrative embodiment, the cryptographic engine 410A operates a pipeline, and the cryptographic engine 410A must complete some or all of the decryption operation before changing the receive encryption key. Additionally or alternatively, the cryptographic engine 410A may perform tasks such as integrity verification with the current receive encryption key. It should be appreciated that, during the time that the cryptographic engine 410A is clearing out the pipeline based on the current receive encryption key, the cryptographic engine 410A cannot begin decrypting messages using the updated receive encryption key. As such, the remote processor will pause sending messages on the channel corresponding to the updated receive encryption key, similar to the pause described in block 544 in FIG. 6.

Once the processing operations using the current receive encryption key have been completed, the processor 402A activates the updated receive encryption key in block 558. The method 500 then loops back to block 510 in FIG. 5 to continue performing encryption operations.

It should be appreciated that the method 500 describes one embodiment, but other embodiments with additional or different operations or operations performed in a different order are possible. For example, the processor 402A can determine the updated transmit encryption key before even determining that the transmit encryption key should be updated, such as shortly after activating a new transmit encryption key. As another example, the processor 402A can send the transmit encryption key to the remote processor before or after sending the key update message. In yet another example, the processor 402A may continue sending messages encrypted with the current transmit key after sending the key switch message, such as sending a predetermined number of messages before activating the updated encryption key and pausing transmission of encrypted messages.

It should further be appreciated that the flowchart shown in FIGS. 5-7 do not correspond to the only possible flow of a method. For example, the processor 402A may send a key update message for the transmit encryption key to the remote processor and, while waiting for a key update confirmation message, may receive a key update message for the receive key from the remote processor. As another example, the processor 402A may send a key update message for the transmit encryption key for a first channel and, while waiting for a key update confirmation message for the first channel, may send a key update message for the transmit encryption key for a second channel.

Figure 8:
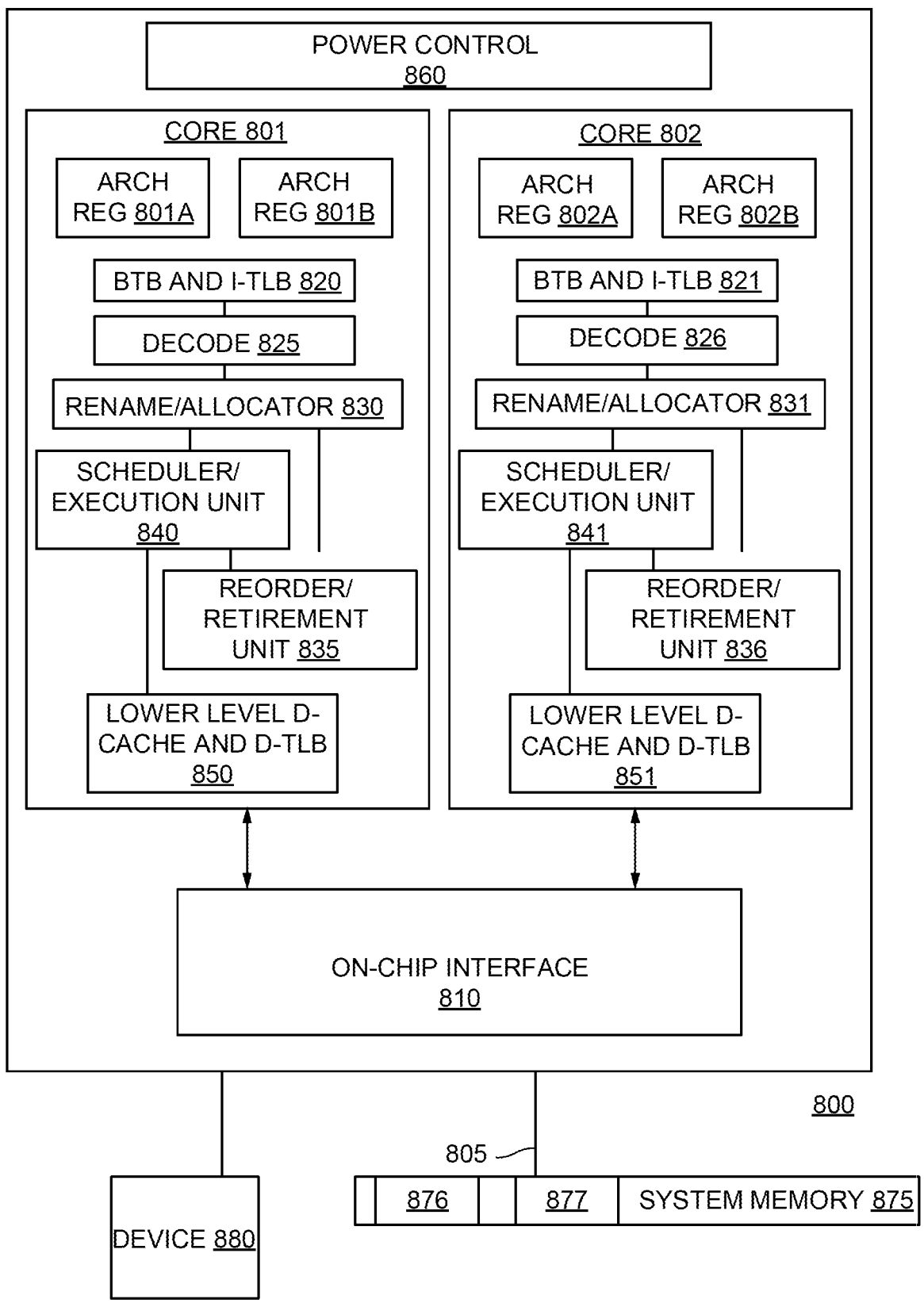
FIG. 8 illustrates an embodiment of a block diagram for a computing system including a multicore processor.

Referring to FIG. 8, an embodiment of a block diagram for a computing system including a multicore processor is depicted. Processor 800 includes any processor or processing device, such as a microprocessor, an embedded processor, a digital signal processor (DSP), a network processor, a handheld processor, an application processor, a co-processor, a system on a chip (SOC), or other device to execute code. Processor 800, in one embodiment, includes at least two cores—core 801 and 802, which may include asymmetric cores or symmetric cores (the illustrated embodiment). However, processor 800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 800, as illustrated in FIG. 8, includes two cores—core 801 and 802. Here, core 801 and 802 are considered symmetric cores, i.e. cores with the same configurations, functional units, and/or logic. In another embodiment, core 801 includes an out-of-order processor core, while core 802 includes an in-order processor core. However, cores 801 and 802 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 801 are described in further detail below, as the units in core 802 operate in a similar manner in the depicted embodiment.

As depicted, core 801 includes two hardware threads 801*a* and 801*b*, which may also be referred to as hardware thread slots 801*a* and 801*b*. Therefore, software entities, such as an operating system, in one embodiment potentially view processor 800 as four separate processors, i.e., four logical processors or processing elements capable of executing four software threads concurrently. As alluded to above, a first thread is associated with architecture state registers 801*a*, a second thread is associated with architecture state registers 801*b*, a third thread may be associated with architecture state registers 802*a*, and a fourth thread may be associated with architecture state registers 802*b*. Here, each of the architecture state registers (801*a*, 801*b*, 802*a*, and 802*b*) may be referred to as processing elements, thread slots, or thread units, as described above. As illustrated, architecture state registers 801*a* are replicated in architecture state registers 801*b*, so individual architecture states/contexts are capable of being stored for logical processor 801*a* and logical processor 801*b*. In core 801, other smaller resources, such as instruction pointers and renaming logic in allocator and renamer block 830 may also be replicated for threads 801*a* and 801*b*. Some resources, such as re-order buffers in reorder/retirement unit 835, ILTB 820, load/store buffers, and queues may be shared through partitioning. Other resources, such as general purpose internal registers, page-table base register(s), low-level data-cache and data-TLB 815, execution unit(s) 840, and portions of out-of-order unit 835 are potentially fully shared.

Processor 800 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 801 includes a simplified, representative out-of-order (OOO) processor core. But an in-order processor may be utilized in different embodiments. The OOO core includes a branch target buffer 820 to predict branches to be executed/taken and an instruction-translation buffer (I-TLB) 820 to store address translation entries for instructions.

Core 801 further includes decode module 825 coupled to fetch unit 820 to decode fetched elements. Fetch logic, in one embodiment, includes individual sequencers associated with thread slots 801*a*, 801*b*, respectively. Usually core 801 is associated with a first ISA, which defines/specifies instructions executable on processor 800. Often machine code instructions that are part of the first ISA include a portion of the instruction (referred to as an opcode), which references/specifies an instruction or operation to be performed. Decode logic 825 includes circuitry that recognizes these instructions from their opcodes and passes the decoded instructions on in the pipeline for processing as defined by the first ISA. For example, as discussed in more detail below decoders 825, in one embodiment, include logic designed or adapted to recognize specific instructions, such as transactional instruction. As a result of the recognition by decoders 825, the architecture or core 801 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 826, in one embodiment, recognize the same ISA (or a subset thereof). Alternatively, in a heterogeneous core environment, decoders 826 recognize a second ISA (either a subset of the first ISA or a distinct ISA).

In one example, allocator and renamer block 830 includes an allocator to reserve resources, such as register files to store instruction processing results. However, threads 801*a* and 801*b* are potentially capable of out-of-order execution, where allocator and renamer block 830 also reserves other resources, such as reorder buffers to track instruction results. Unit 830 may also include a register renamer to rename program/instruction reference registers to other registers internal to processor 800. Reorder/retirement unit 835 includes components, such as the reorder buffers mentioned above, load buffers, and store buffers, to support out-of-order execution and later in-order retirement of instructions executed out-of-order.

Scheduler and execution unit(s) block 840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 850 are coupled to execution unit(s) 840. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 801 and 802 share access to higher-level or further-out cache, such as a second level cache associated with on-chip interface 810. Note that higher-level or further-out refers to cache levels increasing or getting further way from the execution unit(s). In one embodiment, higher-level cache is a last-level data cache—last cache in the memory hierarchy on processor 800—such as a second or third level data cache. However, higher level cache is not so limited, as it may be associated with or include an instruction cache. A trace cache—a type of instruction cache—instead may be coupled after decoder 825 to store recently decoded traces. Here, an instruction potentially refers to a macro-instruction (i.e. a general instruction recognized by the decoders), which may decode into a number of micro-instructions (micro-operations).

In the depicted configuration, processor 800 also includes on-chip interface module 810. Historically, a memory controller, which is described in more detail below, has been included in a computing system external to processor 800. In this scenario, on-chip interface 810 is to communicate with devices external to processor 800, such as system memory 875, a chipset (often including a memory controller hub to connect to memory 875 and an I/O controller hub to connect peripheral devices), a memory controller hub, a northbridge, or other integrated circuit. And in this scenario, bus 805 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 875 may be dedicated to processor 800 or shared with other devices in a system. Common examples of types of memory 875 include DRAM, SRAM, non-volatile memory (NV memory), and other known storage devices. Note that device 880 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 800. For example in one embodiment, a memory controller hub is on the same package and/or die with processor 800. Here, a portion of the core (an on-core portion) 810 includes one or more controller(s) for interfacing with other devices such as memory 875 or a graphics device 880. The configuration including an interconnect and controllers for interfacing with such devices is often referred to as an on-core (or un-core configuration). As an example, on-chip interface 810 includes a ring interconnect for on-chip communication and a high-speed serial point-to-point link 805 for off-chip communication. Yet, in the SOC environment, even more devices, such as the network interface, co-processors, memory 875, graphics processor 880, and any other known computer devices/interface may be integrated on a single die or integrated circuit to provide small form factor with high functionality and low power consumption.

In one embodiment, processor 800 is capable of executing a compiler, optimization, and/or translator code 877 to compile, translate, and/or optimize application code 876 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 9:
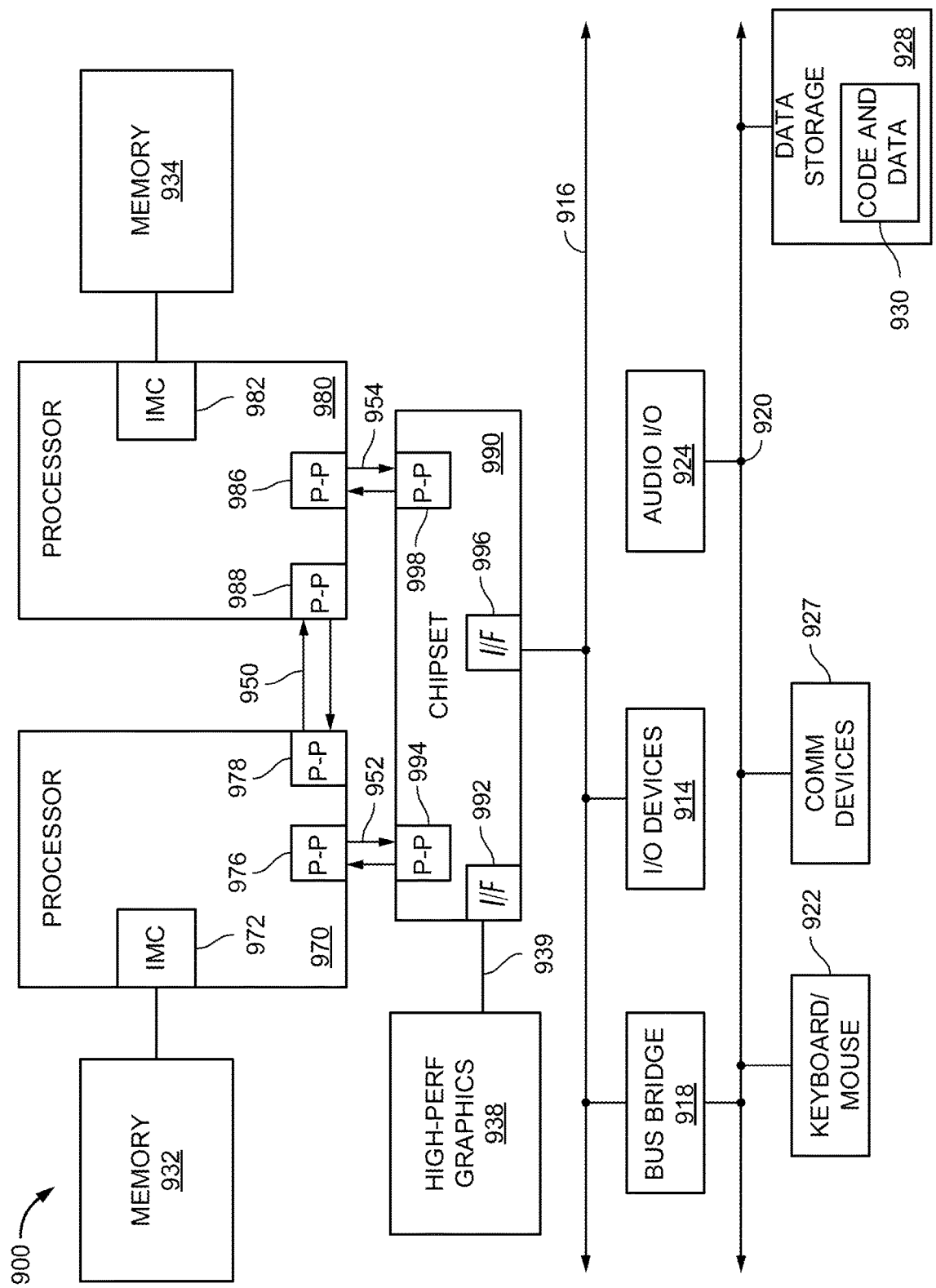
FIG. 9 illustrates an embodiment of a block for a computing system including multiple processors.

Referring now to FIG. 9, shown is a block diagram of another system 900 in accordance with an embodiment of the present disclosure. As shown in FIG. 19, multiprocessor system 900 is a point-to-point interconnect system, and includes a first processor 970 and a second processor 980 coupled via a point-to-point interconnect 950. Each of processors 970 and 980 may be some version of a processor. In one embodiment, 952 and 954 are part of a serial, point-to-point coherent interconnect fabric, such as a high-performance architecture. As a result, aspects of the present disclosure may be implemented within the QPI architecture.

While shown with only two processors 970, 980, it is to be understood that the scope of the present disclosure is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 19, IMCs 972 and 982 couple the processors to respective memories, namely a memory 932 and a memory 934, which may be portions of main memory locally attached to the respective processors.

Processors 970, 980 each exchange information with a chipset 990 via individual P-P interfaces 952, 954 using point to point interface circuits 976, 994, 986, 998. Chipset 990 also exchanges information with a high-performance graphics circuit 938 via an interface circuit 992 along a high-performance graphics interconnect 939.

A shared cache (not shown) may be included in either processor or outside of both processors; yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 are coupled to first bus 916, along with a bus bridge 918 which couples first bus 916 to a second bus 920. In one embodiment, second bus 920 includes a low pin count (LPC) bus. Various devices are coupled to second bus 920 including, for example, a keyboard and/or mouse 922, communication devices 927 and a storage unit 928 such as a disk drive or other mass storage device which often includes instructions/code and data 930, in one embodiment. Further, an audio I/O 924 is shown coupled to second bus 920. Note that other architectures are possible, where the included components and interconnect architectures vary. For example, instead of the point-to-point architecture of FIG. 9, a system may implement a multi-drop bus or other such architecture.

While aspects of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES

Illustrative examples of the technologies disclosed herein are provided below. An embodiment of the technologies may include any one or more, and any combination of, the examples described below.

Example 1 includes an apparatus comprising point-to-point interface circuitry comprising a cryptographic engine, the point-to-point interface circuitry to establish an encrypted point-to-point link with a processor, wherein the point-to-point interface circuitry is to use a first encryption key to encrypt messages in the cryptographic engine for the encrypted point-to-point link; determine an updated encryption key; transmit a key switch message to the processor to instruct the processor to use the updated encryption key; and perform, after transmission of the key switch message and without sending encrypted messages on at least one channel corresponding to the updated encryption key over the point-to-point link, one or more stages of a pipeline of the cryptographic engine to encrypt messages with the updated encryption key.

Example 2 includes the subject matter of Example 1, and wherein the point-to-point interface circuitry is further to transmit a key update message to the processor to instruct the processor to prepare to use the updated encryption key; and receive a key update confirmation message from the processor indicating that the processor is prepared to use the updated encryption key, wherein to transmit the key switch message comprises to transmit the key switch message in response to receipt of the key update confirmation message from the processor.

Example 3 includes the subject matter of any of Examples 1 and 2, and wherein transmission of encrypted messages is to be paused after transmission of the key switch message for a predetermined amount of time.

Example 4 includes the subject matter of any of Examples 1-3, and wherein the encrypted point-to-point link comprises a plurality of channels, wherein the plurality of channels comprises a first channel and a second channel, wherein the first encryption key is associated with the first channel, wherein the point-to-point interface circuitry is to pause transmission of encrypted messages of the first channel and continue transmission of encrypted messages of the second channel for a predetermined amount of time after transmission of the key switch message.

Example 5 includes the subject matter of any of Examples 1-4, and wherein to transmit the key switch message comprises to transmit the key switch message based on an amount of data transferred with use of the first encryption key.

Example 6 includes the subject matter of any of Examples 1-5, and wherein to transmit the key switch message comprises to transmit the key switch message based on an amount of time since the first encryption key was first used.

Example 7 includes the subject matter of any of Examples 1-6, and wherein to establish the encrypted point-to-point link comprises to establish a transmit link to transmit messages to the processor with use of a first transmit encryption key, wherein the first encryption key is the first transmit encryption key; and establish a receive link to receive messages from the processor with use of a first receive encryption key, wherein the point-to-point interface circuitry is further to decrypt messages received from the processor in the cryptographic engine with use of the first receive encryption key and with use of a receive pipeline of the cryptographic engine; determine an updated receive encryption key; receive, from the processor, a key switch message to instruct the apparatus to use the updated receive encryption key; and clear, in response to the key switch message, the receive pipeline of the encrypted engine with use of the first receive encryption key; and switch the cryptographic engine to use the updated receive encryption key in place of the first receive encryption key.

Example 8 includes the subject matter of any of Examples 1-7, and wherein to determine the updated receive encryption key comprises to determine the updated receive encryption key based on communication with the processor.

Example 9 includes the subject matter of any of Examples 1-8, and wherein the encrypted point-to-point link is to use the first encryption key to encrypt messages with integrity protection with use of Advanced Encryption Standard-Galois/Counter Mode (AES-GCM).

Example 10 includes the subject matter of any of Examples 1-9, and wherein the encrypted point-to-point link is to use the first encryption key to encrypt messages with use of Advanced Encryption Standard in Counter mode (AES-CTR) and an integrity key to integrity protect messages with use of AES-Galois message authentication code (AES-GMAC).

Example 11 includes an apparatus comprising point-to-point interface circuitry comprising a cryptographic engine, the point-to-point interface circuitry to establish an encrypted point-to-point link with a processor, wherein the point-to-point interface circuitry is to use a first encryption key to encrypt messages in the cryptographic engine for the encrypted point-to-point link; determine an updated encryption key; transmit a key switch message to the processor to instruct the processor to use the updated encryption key; and transmit, after transmission of the key switch message and without a reset of the encrypted point-to-point link, encrypted messages with use of the updated encryption key.

Example 12 includes the subject matter of Example 11, and wherein the point-to-point interface circuitry is further to transmit a key update message to the processor to instruct the processor to prepare to use the updated encryption key; and receive a key update confirmation message from the processor indicating that the processor is prepared to use the updated encryption key, wherein to transmit the key switch message comprises to transmit the key switch message in response to receipt of the key update confirmation message from the processor.

Example 13 includes the subject matter of any of Examples 11 and 12, and wherein transmission of encrypted messages is to be paused after transmission of the key switch message for a predetermined amount of time.

Example 14 includes the subject matter of any of Examples 11-13, and wherein the encrypted point-to-point link comprises a plurality of channels, wherein the plurality of channels comprises a first channel and a second channel, wherein the first encryption key is associated with the first channel, wherein the point-to-point interface circuitry is to pause transmission of encrypted messages of the first channel and continue transmission of encrypted messages of the second channel for a predetermined amount of time after transmission of the key switch message.

Example 15 includes the subject matter of any of Examples 11-14, and wherein to transmit the key switch message comprises to transmit the key switch message based on an amount of data transferred with use of the first encryption key.

Example 16 includes the subject matter of any of Examples 11-15, and wherein to transmit the key switch message comprises to transmit the key switch message based on an amount of time since the first encryption key was first used.

Example 17 includes the subject matter of any of Examples 11-16, and wherein to establish the encrypted point-to-point link comprises to establish a transmit link to transmit messages to the processor with use of a first transmit encryption key, wherein the first encryption key is the first transmit encryption key; and establish a receive link to receive messages from the processor with use of a first receive encryption key, wherein the point-to-point interface circuitry is further to decrypt messages received from the processor in the cryptographic engine with use of the first receive encryption key and with use of a pipeline of the cryptographic engine; determine an updated receive encryption key; receive, from the processor, a key switch message to instruct the apparatus to use the updated receive encryption key; and clear, in response to the key switch message, the pipeline of the encrypted engine with use of the first receive encryption key; and switch the cryptographic engine to use the updated receive encryption key in place of the first receive encryption key.

Example 18 includes the subject matter of any of Examples 11-17, and wherein to determine the updated receive encryption key comprises to determine the updated receive encryption key based on communication with the processor.

Example 19 includes the subject matter of any of Examples 11-18, and wherein the encrypted point-to-point link is to use the first encryption key to encrypt messages with integrity protection with use of Advanced Encryption Standard-Galois/Counter Mode (AES-GCM).

Example 20 includes the subject matter of any of Examples 11-19, and wherein the encrypted point-to-point link is to use the first encryption key to encrypt messages with use of Advanced Encryption Standard in Counter mode (AES-CTR) and an integrity key to integrity protect messages with use of AES-Galois message authentication code (AES-GMAC).

Example 21 includes a system comprising a plurality of processors comprising a first processor and a second processor, wherein the first processor comprises first point-to-point interface circuitry and the second processor comprises second point-to-point interface circuitry, wherein the first point-to-point interface circuitry is to establish an encrypted point-to-point link with the second point-to-point interface circuitry, wherein the first point-to-point interface circuitry is to use a first encryption key to encrypt messages for the encrypted point-to-point link; determine an updated encryption key; and transmit a key switch message to the second processor to instruct the second processor to use the updated encryption key, wherein the second point-to-point interface circuitry is to receive, from the first processor, the key switch message to instruct the second processor to use the updated encryption key; and clear, in response to the key switch message, a pipeline of a cryptographic engine of the second point-to-point interface circuitry with use of the first encryption key; and switch, in response to the key switch message, the cryptographic engine to use the updated encryption key in place of the first encryption key.

Example 22 includes the subject matter of Example 21, and wherein the point-to-point interface circuitry is further to transmit a key update message to the second processor to instruct the second processor to prepare to use the updated encryption key; and receive a key update confirmation message from the second processor indicating that the second processor is prepared to use the updated encryption key, wherein to transmit the key switch message comprises to transmit the key switch message in response to receipt of the key update confirmation message from the second processor.

Example 23 includes the subject matter of any of Examples 21 and 22, and wherein transmission of encrypted messages by the first point-to-point interface circuitry is to be paused after transmission of the key switch message.

Example 24 includes the subject matter of any of Examples 21-23, and wherein the encrypted point-to-point link comprises a plurality of channels, wherein the plurality of channels comprises a first channel and a second channel, wherein the first encryption key is associated with the first channel, wherein the first point-to-point interface circuitry is to pause transmission of encrypted messages of the first channel and continue transmission of encrypted messages of the second channel for a predetermined amount of time after transmission of the key switch message.

Example 25 includes the subject matter of any of Examples 21-24, and wherein to transmit the key switch message comprises to transmit the key switch message based on an amount of data transferred with use of the first encryption key.

Example 26 includes the subject matter of any of Examples 21-25, and wherein to transmit the key switch message comprises to transmit the key switch message based on an amount of time since the first encryption key was first used.

Example 27 includes a method comprising establishing, by a processor, an encrypted point-to-point link with a second processor, wherein the encrypted point-to-point link is to use a first encryption key to encrypt messages; determining that the first encryption key should be updated; determining an updated encryption key; transmitting, by the processor, a key switch message to the second processor to instruct the second processor to use the updated encryption key; and performing, after transmission of the key switch message and without sending encrypted messages on at least one channel corresponding to the updated encryption key over the point-to-point link, one or more stages of a pipeline of the cryptographic engine to encrypt messages with the updated encryption key.

Example 28 includes the subject matter of Example 27, and further including transmitting, by the processor, a key update message to the second processor to instruct the second processor to prepare to use the updated encryption key; and receiving, by the processor, a key update confirmation message from the second processor indicating that the second processor is prepared to use the updated encryption key, wherein transmitting the key switch message comprises transmitting the key switch message in response to receipt of the key update confirmation message from the second processor.

Example 29 includes the subject matter of any of Examples 27 and 28, and wherein transmission of encrypted messages is to be paused after transmission of the key switch message for a predetermined amount of time.

Example 30 includes the subject matter of any of Examples 27-29, and wherein the encrypted point-to-point link comprises a plurality of channels, wherein the plurality of channels comprises a first channel and a second channel, wherein the first encryption key is associated with the first channel, further comprising pausing transmission of encrypted messages of the first channel and continuing transmission of encrypted messages of the second channel for a predetermined amount of time after transmission of the key switch message.

Example 31 includes the subject matter of any of Examples 27-30, and wherein determining that the first encryption key should be updated comprises determining that the first encryption key should be updated based on an amount of data transferred with use of the first encryption key.

Example 32 includes the subject matter of any of Examples 27-31, and wherein determining that the first encryption key should be updated comprises determining that the first encryption key should be updated based on an amount of time since the first encryption key was first used.

Example 33 includes the subject matter of any of Examples 27-32, and wherein establishing the encrypted point-to-point link comprises establishing a transmit link to transmit messages to the second processor with use of a first transmit encryption key, wherein the first encryption key is the first transmit encryption key; and establishing a receive link to receive messages from the second processor with use of a first receive encryption key, the method further comprising decrypting, by the processor, messages received from the second processor in a cryptographic engine with use of the first receive encryption key and with use of a pipeline of the cryptographic engine; determining, by the processor, an updated receive encryption key; receiving, by the processor and from the second processor, a key switch message to instruct the processor to use the updated receive encryption key; and clearing, by the processor and in response to the key switch message, the pipeline of the encrypted engine with use of the first receive encryption key; and switching, by the processor, the cryptographic engine to use the updated receive encryption key in place of the first receive encryption key.

Example 34 includes the subject matter of any of Examples 27-33, and wherein determining the updated receive encryption key comprises determining the updated receive encryption key based on communication with the second processor.

Example 35 includes one or more computer-readable media comprising a plurality of instructions stored thereon that, when executed, causes a processor to perform the method of any of Examples 19-26.

Example 36 includes an apparatus comprising means to perform the method of any of Examples 19-26.

Example 37 includes an apparatus comprising means for establishing an encrypted point-to-point link with a processor, wherein the encrypted point-to-point link is to use a first encryption key to encrypt messages; means for determining that the first encryption key should be updated; means for determining an updated encryption key; means for transmitting a key switch message to the processor to instruct the processor to use the updated encryption key; and means for performing, after transmission of the key switch message and without sending encrypted messages on at least one channel corresponding to the updated encryption key over the point-to-point link, one or more stages of a pipeline of the cryptographic engine to encrypt messages with the updated encryption key.

Example 38 includes the subject matter of Example 37, and further including means for transmitting a key update message to the processor to instruct the processor to prepare to use the updated encryption key; and means for receiving a key update confirmation message from the processor indicating that the processor is prepared to use the updated encryption key, wherein the means for transmitting the key switch message comprises means for transmitting the key switch message in response to receipt of the key update confirmation message from the processor.

Example 39 includes the subject matter of any of Examples 37 and 38, and wherein transmission of encrypted messages is to be paused after transmission of the key switch message for a predetermined amount of time.

Example 40 includes the subject matter of any of Examples 37-39, and wherein the encrypted point-to-point link comprises a plurality of channels, wherein the plurality of channels comprises a first channel and a second channel, wherein the first encryption key is associated with the first channel, further comprising means for pausing transmission of encrypted messages of the first channel and means for continuing transmission of encrypted messages of the second channel for a predetermined amount of time after transmission of the key switch message.

Example 41 includes the subject matter of any of Examples 37-40, and wherein the means for determining that the first encryption key should be updated comprises means for determining that the first encryption key should be updated based on an amount of data transferred with use of the first encryption key.

Example 42 includes the subject matter of any of Examples 37-41, and wherein the means for determining that the first encryption key should be updated comprises means for determining that the first encryption key should be updated based on an amount of time since the first encryption key was first used.

Example 43 includes the subject matter of any of Examples 37-42, and wherein the means for establishing the encrypted point-to-point link comprises means for establishing a transmit link to transmit messages to the processor with use of a first transmit encryption key, wherein the first encryption key is the first transmit encryption key; and means for establishing a receive link to receive messages from the processor with use of a first receive encryption key, the apparatus further comprising means for decrypting messages received from the processor in a cryptographic engine with use of the first receive encryption key and with use of a pipeline of the cryptographic engine; means for determining an updated receive encryption key; means for receiving, from the processor, a key switch message to instruct the apparatus to use the updated receive encryption key; and means for clearing, in response to the key switch message, the pipeline of the encrypted engine with use of the first receive encryption key; and means for switching the cryptographic engine to use the updated receive encryption key in place of the first receive encryption key.

Example 44 includes the subject matter of any of Examples 37-43, and wherein the means for determining the updated receive encryption key comprises means for determining the updated receive encryption key based on communication with the processor.

The invention claimed is:

1. An apparatus comprising:
point-to-point interface circuitry comprising a cryptographic engine, the point-to-point interface circuitry to:
  establish an encrypted point-to-point link between the point-to-point interface circuitry and a processor, wherein the processor is a CPU of the apparatus, wherein the point-to-point interface circuitry is to use a first encryption key to encrypt messages in the cryptographic engine for the encrypted point-to-point link;
  determine an updated encryption key;
  transmit, on a channel of the point-to-point link corresponding to the updated encryption key, a key switch message to the processor to instruct the processor to use the updated encryption key;
  perform, after transmission of the key switch message and without sending encrypted messages on the channel, one or more stages of a pipeline of the cryptographic engine to encrypt one or more messages with the updated encryption key; and
  send the one or more messages encrypted with the updated encryption key on the channel.

2. The apparatus of claim 1, wherein the point-to-point interface circuitry is further to:
  transmit a key update message to the processor to instruct the processor to prepare to use the updated encryption key; and
  receive a key update confirmation message from the processor indicating that the processor is prepared to use the updated encryption key,
  wherein to transmit the key switch message comprises to transmit the key switch message in response to receipt of the key update confirmation message from the processor.

3. The apparatus of claim 1, wherein transmission of encrypted messages is to be paused after transmission of the key switch message for a predetermined amount of time to allow the processor to decrypt messages in a pipeline of a cryptographic engine of the processor with the first encryption key.

4. The apparatus of claim 3, wherein the point-to-point interface circuitry is to automatically resume transmission of encrypted messages after the predetermined amount of time.

5. The apparatus of claim 1, wherein the encrypted point-to-point link comprises a plurality of channels, wherein the plurality of channels comprises a first channel and a second channel,
  wherein the first encryption key is associated with the first channel,
  wherein the point-to-point interface circuitry is to pause transmission of encrypted messages of the first channel and continue transmission of encrypted messages of the second channel for a predetermined amount of time after transmission of the key switch message.

6. The apparatus of claim 1, wherein to transmit the key switch message comprises to transmit the key switch message based on an amount of data transferred with use of the first encryption key.

7. The apparatus of claim 1, wherein to transmit the key switch message comprises to transmit the key switch message based on an amount of time since the first encryption key was first used.

8. The apparatus of claim 1,
  wherein to establish the encrypted point-to-point link comprises to:
    establish a transmit link to transmit messages to the processor with use of a first transmit encryption key, wherein the first encryption key is the first transmit encryption key; and
    establish a receive link to receive messages from the processor with use of a first receive encryption key,
  wherein the point-to-point interface circuitry is further to:
    decrypt messages received from the processor in the cryptographic engine with use of the first receive encryption key and with use of a receive pipeline of the cryptographic engine;
    determine an updated receive encryption key;
    receive, from the processor, a key switch message to instruct the apparatus to use the updated receive encryption key; and
    clear, in response to the key switch message, the receive pipeline of the cryptographic engine with use of the first receive encryption key by completing decryption of messages in the receive pipeline; and
    switch the cryptographic engine to use the updated receive encryption key in place of the first receive encryption key in response to the receive pipeline being cleared.

9. The apparatus of claim 8, wherein to determine the updated receive encryption key comprises to determine the updated receive encryption key based on communication with the processor.

10. The apparatus of claim 1, wherein the encrypted point-to-point link is to use the first encryption key to encrypt messages with integrity protection with use of Advanced Encryption Standard-Galois/Counter Mode (AES-GCM).

11. The apparatus of claim 1, wherein the encrypted point-to-point link is to use the first encryption key to encrypt messages with use of Advanced Encryption Standard in Counter mode (AES-CTR) and an integrity key to integrity protect messages with use of AES-Galois message authentication code (AES-GMAC).

12. The apparatus of claim 1, the point-to-point interface circuitry is in a second CPU of the apparatus, wherein the CPU is mounted on a motherboard, wherein the second CPU is mounted on the motherboard.

13. A system comprising:
a plurality of processors comprising a first processor and a second processor, wherein the first processor comprises first point-to-point interface circuitry and the second processor comprises second point-to-point interface circuitry,
wherein the first point-to-point interface circuitry is to:
establish an encrypted point-to-point link between the first point-to-point interface circuitry and the second point-to-point interface circuitry, wherein the first point-to-point interface circuitry is to use a first encryption key to encrypt messages for the encrypted point-to-point link;
determine an updated encryption key; and
transmit a key switch message to the second processor to instruct the second processor to use the updated encryption key,
wherein the second point-to-point interface circuitry is to:
receive, from the first processor, the key switch message to instruct the second processor to use the updated encryption key; and
clear, in response to the key switch message, a pipeline of a cryptographic engine of the second point-to-point interface circuitry with use of the first encryption key by completing processing of messages in the pipeline; and
switch, in response to the key switch message, the cryptographic engine to use the updated encryption key in place of the first encryption key in response to the pipeline being cleared.

14. The system of claim 13, wherein the point-to-point interface circuitry is further to:
transmit a key update message to the second processor to instruct the second processor to prepare to use the updated encryption key; and
receive a key update confirmation message from the second processor indicating that the second processor is prepared to use the updated encryption key,
wherein to transmit the key switch message comprises to transmit the key switch message in response to receipt of the key update confirmation message from the second processor.

15. The system of claim 13, wherein transmission of encrypted messages by the first point-to-point interface circuitry is to be paused after transmission of the key switch message for a predetermined amount of time to allow the second point-to-point interface circuitry to decrypt messages in a pipeline of a cryptographic engine of the second processor with the first encryption key.

16. The system of claim 13, wherein the encrypted point-to-point link comprises a plurality of channels, wherein the plurality of channels comprises a first channel and a second channel,
wherein the first encryption key is associated with the first channel,
wherein the first point-to-point interface circuitry is to pause transmission of encrypted messages of the first channel and continue transmission of encrypted messages of the second channel for a predetermined amount of time after transmission of the key switch message.

17. The system of claim 13, wherein to transmit the key switch message comprises to transmit the key switch message based on an amount of data transferred with use of the first encryption key.

18. An apparatus comprising:
point-to-point interface circuitry comprising a cryptographic engine, the point-to-point interface circuitry to:
establish an encrypted point-to-point link between the point-to-point interface circuitry and a processor, wherein the processor is a CPU of the apparatus, wherein the point-to-point interface circuitry is to use a first encryption key to encrypt messages in the cryptographic engine for the encrypted point-to-point link;
determine an updated encryption key;
transmit a key switch message to the processor to instruct the processor to use the updated encryption key; and
transmit, after transmission of the key switch message and without a reset of the encrypted point-to-point link, encrypted messages with use of the updated encryption key.

19. The apparatus of claim 18, wherein the point-to-point interface circuitry is further to:
transmit a key update message to the processor to instruct the processor to prepare to use the updated encryption key; and
receive a key update confirmation message from the processor indicating that the processor is prepared to use the updated encryption key,
wherein to transmit the key switch message comprises to transmit the key switch message in response to receipt of the key update confirmation message from the processor.

20. The apparatus of claim 18, wherein transmission of encrypted messages is to be paused after transmission of the key switch message for a predetermined amount of time to allow the processor to decrypt messages in a pipeline of a cryptographic engine of the processor with the first encryption key.

21. The apparatus of claim 18, wherein the encrypted point-to-point link comprises a plurality of channels, wherein the plurality of channels comprises a first channel and a second channel, wherein transmit the key switch message comprises to transmit the key switch message over the first channel,
wherein the first encryption key is associated with the first channel,
wherein the point-to-point interface circuitry is to pause transmission of encrypted messages of the first channel and continue transmission of encrypted messages of the second channel for a predetermined amount of time after transmission of the key switch message.

22. The apparatus of claim 18, wherein to transmit the key switch message comprises to transmit the key switch message based on an amount of data transferred with use of the first encryption key.

23. The apparatus of claim 18, wherein to transmit the key switch message comprises to transmit the key switch message based on an amount of time since the first encryption key was first used.

24. The apparatus of claim 18,
wherein to establish the encrypted point-to-point link comprises to:

establish a transmit link to transmit messages to the processor with use of a first transmit encryption key, wherein the first encryption key is the first transmit encryption key; and establish a receive link to receive messages from the processor with use of a first receive encryption key, wherein the point-to-point interface circuitry is further to:

decrypt messages received from the processor in the cryptographic engine with use of the first receive encryption key and with use of a pipeline of the cryptographic engine;

determine an updated receive encryption key;

receive, from the processor, a key switch message to instruct the apparatus to use the updated receive encryption key; and clear, in response to the key switch message, the pipeline of the cryptographic engine with use of the first receive encryption key by completing decryption of messages in the receive pipeline; and switch the cryptographic engine to use the updated receive encryption key in place of the first receive encryption key in response to the receive pipeline being cleared.

25. The apparatus of claim 24, wherein to determine the updated receive encryption key comprises to determine the updated receive encryption key based on communication with the processor.

\* \* \* \* \*